UNITED STATES PATENT OFFICE.

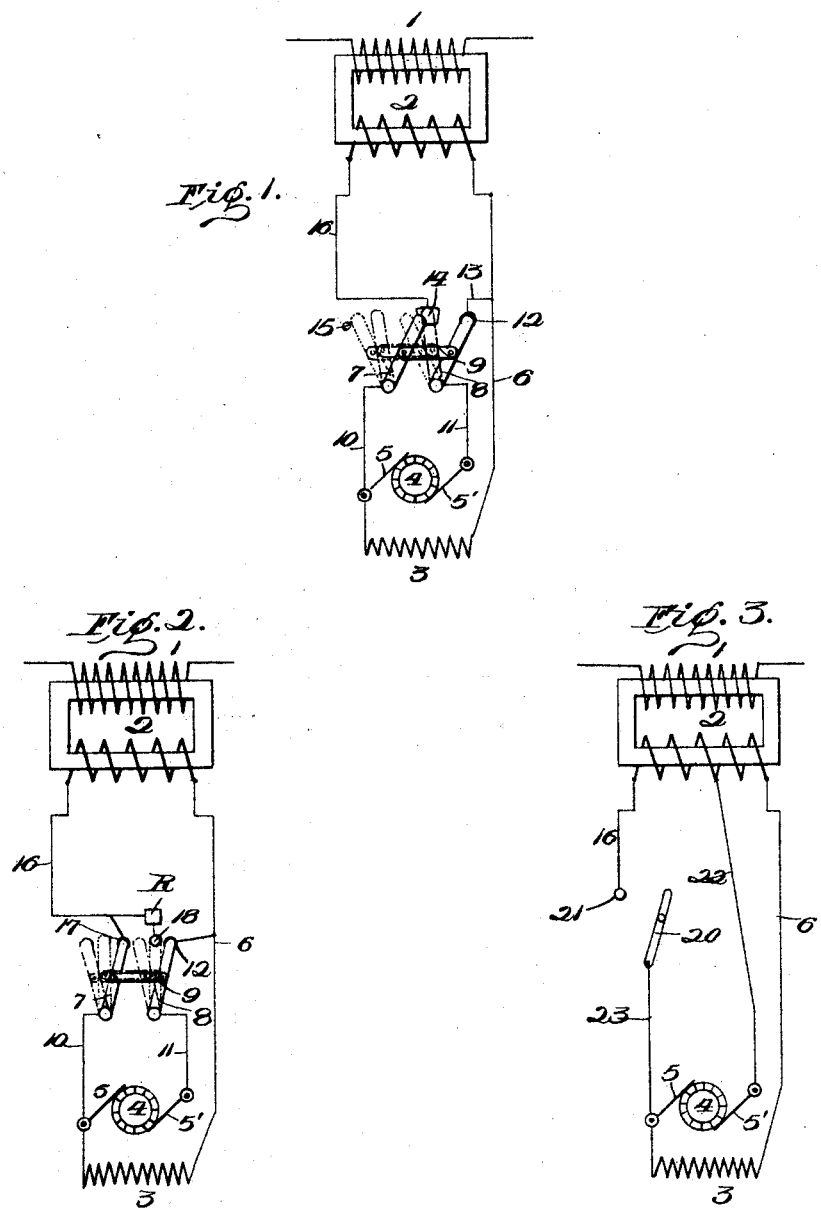

OSCAR H. PIEPER AND ALPHONSE F. PIEPER, OF ROCHESTER, NEW YORK.

ELECTRIC-MOTOR REGULATION.

SPECIFICATION forming part of Letters Patent No. 623,622, dated April 25, 1899.

Application filed October 14, 1898. Serial No. 693,531. (No model.)

*To all whom it may concern:*

Be it known that we, OSCAR H. PIEPER and ALPHONSE F. PIEPER, of Rochester, in the county of Monroe and State of New York, have invented certain new and useful Improvements in Electric-Motor Regulation; and we do hereby declare the following to be a full, clear, and exact description of the same, reference being had to the accompanying drawings, forming a part of this specification, and to the reference-numerals marked thereon.

Our present invention has for its object to provide an improved method of and apparatus for arresting the rotation of electric motors, particularly alternating shunt-wound motors; and it consists generally when desired to bring the armature to a sudden stop in converting the machine into a series-wound machine, thus changing the direction of current either through the armature or field, but leaving it the same through the other—that is, through the field or armature, as the case may be—and in the preferred arrangement we can use less voltage on the armature than on the field, and then when the machine becomes a series machine the low voltage previously only on the armature now acts on the entire machine—that is, through armature and field in series—with the result that it is not of sufficient strength to start it in the reverse direction if the motor is properly wound for alternating currents, but will bring it to rest.

In the accompanying drawings, Figures 1, 2, and 3 indicate, diagrammatically, different means for carrying out our invention.

Similar reference-numerals in the several figures indicate similar parts.

Inasmuch as alternating-current motors are now generally operated from transformers, we have in the present embodiment of our invention shown the source of current as a secondary coil 2 of the transformer, 1 indicating the primary; 3, the field-coil of the motor; 4, the armature thereof, and 5 5' the commutator-brushes.

In the embodiment of our invention shown in Fig. 1 we provide switching devices for changing the machine from shunt to series in order to arrest the rotation of the armature; but as this change with current of full strength might tend to cause the operation of the machine in the opposite direction the switch-contacts are so arranged that the machine is only coupled in series long enough to cause the arrest of the armature, and then by the continued movement of the movable switch member the circuit is broken before the machine has an opportunity to start in the opposite direction. In said figure we have shown a double-pole switch, composed of the conducting-arms 7 and 8, connected by a handle 9, and from said switch-arm extend wires 10 and 11, the former connected with the arm 7 and with one of the commutator-brushes 5 in multiple with the field and the other wire 11 connecting with the arm 8 and also with the opposite brush 5'. The field-coil 3 is connected directly with one terminal of the tranformer-secondary by the conductor 6, and the switch contact 12, with which the switch-arm 8 coöperates, is connected by the conductor 13 with the terminal of the transformer-secondary or other source of power to which the conductor 6 is connected.

14 indicates a contact-plate over which the switch-arm 8 moves after leaving the contact 12. The stop-pin 15, limiting the movement of the switch, is so located that the switch-arm 8 is arrested after it has moved off the plate 14. The contact-plate 14 is connected by conductor 16 with the terminal of the secondary opposite that to which the conductor 6 is connected. The switch-arm 7 is normally in contact with said plate 14 when the machine is running as shunt-wound, as shown in full lines in said figure, this being the normal position of the switch when the motor is in operation. When it is desired to arrest the motor, the switch is moved to the position shown in dotted lines, breaking the circuit between the conductors 10 and 16 as the arm 7 leaves the plate 14, then placing the armature and field in series through conductor 16, switch-arm 8, conductor 11 while said arm is moving across the plate 14, as shown in dot-and-dash lines, the length of said plate being such that in the normal operation of the switch the armature will come to rest at about the time the switch leaves the contact 14 and breaks the circuit.

Another way of accomplishing the same object is to employ a double-pole switch, as shown in Fig. 2; but in this instance instead of converting the machine from shunt to series and then breaking the circuit we use full voltage on the field and armature, but when making the change from shunt to series throw a resistance or self-induction into the circuit. In the construction shown in Fig. 2 the movable portion of the switch is substantially the same as in Fig. 1, excepting that instead of employing the contact plate or segment 14 we employ two contacts—one, 17, with which the switch-arm 7 is in normal contact and connected to the conductor 16, and the other, 18, with which the switch-arm 8 coöperates when the machine is series wound, a resistance R being interposed between said contact 18 and the conductor 16, as shown in Fig. 2. From this it will be seen that when the switch is moved to the position in dotted lines the current passing to the motor when the armature and field are in series will be at a decreased voltage, which will effectually prevent the motor from starting in the opposite direction if it is properly constructed, and then the circuit is broken by moving the switch to the position shown in dot-and-dash lines.

In the embodiment of our invention illustrated in Fig. 3 instead of employing a double-pole switch we connect the field-coil 3 directly by the conductor 6 with one terminal of the transformer or source of energy and the other terminal of the field with the brush 5, and thence by conductor 23 through movable switch-arm 20, contact 21, and conductor 16 to the other terminal of the secondary coil. The other brush 5' of the commutator is connected by conductor 22 with some portion of the secondary coil of the transformer intermediate the ends thereof, and preferably about the center, this arrangement being such that when the machine is running with the switch 20 on the contact 21 the machine will be shunt-wound; but the voltage in the armature will be approximately half that in the field. In order to arrest the motor, it is only necessary to remove the switch 20 from the contact 21, thus reversing the current in the armature, but keeping it in the same direction in the field, and the low voltage previously only in the armature now acts on the entire machine—that is, armature and field in series—with the result that it is not sufficient to start the machine in the opposite direction, but will bring it to a sudden stop.

For small motors, such as used to operate dental engines and similar light machines, we prefer the arrangement shown in Fig. 3, the only change being the employment of the switch and the tapping of the center of the secondary coil of the transformer.

It will be obvious to those skilled in the art that the same effects will be produced if instead of reversing the current through the armature and leaving it of the same polarity through the field the current should be reversed through the field and left at the same polarity through the armature.

We claim as our invention—

1. The method of arresting the rotation of alternating-current shunt-wound electric motors, consisting in reversing the current through the armature and coupling the latter in series with the field.

2. The method of arresting the rotation of alternating-current shunt-wound electric motors, consisting in reversing the current through the armature at a lower voltage than normal and coupling the latter in series with the field.

3. In an alternating-current electric motor, the combination with the field and armature normally connected in mutiple arc with a source of electric energy, of switching devices for coupling the field and armature in series with the current reversed in the armature.

4. In an alternating-current electric motor, the combination with the field and armature, normally connected in multiple arc with a source of electric energy, of switching devices, and connections for reversing the current in the armature at a lower voltage than that normally furnished to the field by the source of electric energy and simultaneously connecting the field and armature in series.

5. In an alternating-current electric motor, the combination with the field, armature and a source of electric energy, said field and armature being coupled in multiple arc with the source of energy with lower voltage in the armature-circuit than in the field, and a switch in the main circuit between one armature-terminal and the source of energy, whereby, when said switch is opened, the current will pass through the armature and field in series and at a lower voltage than is normally in the field when the machine is in operation, thereby arresting the operation of the motor.

6. The combination with the secondary coil of an electric transformer, of a shunt-wound electric motor for alternating currents, having the field connected to the terminals of the transformer-coil, the armature having one terminal connected to one terminal of the field, and the other connected to the transformer-coil intermediate its length, and a switch in the circuit between the terminal of the transformer-coil and the armature-terminal connected to the field, whereby, when said switch is opened, a current of less than normal voltage and opposite polarity will pass through the armature and through the field in series therewith, and arrest the motor.

7. The combination with the transformer-coil 2, of a shunt-wound electric motor for alternating currents, having the field 3 and armature 4, and commutator-brushes 5 and 5', the conductor 6 leading from one transformer-terminal to the field, and the latter connected to the brush 5, the conductors 23 and 16, the switch between them, and the conductor 22 connected to the transformer-coil intermediate its ends and to the commutator-brush 5', substantially as described and for the purpose specified.

OSCAR H. PIEPER.
ALPHONSE F. PIEPER.

Witnesses:
F. F. CHURCH,
G. A. RODA.